(12) United States Patent
Woodward et al.

(10) Patent No.: US 8,983,836 B2
(45) Date of Patent: Mar. 17, 2015

(54) CAPTIONING USING SOCIALLY DERIVED ACOUSTIC PROFILES

(71) Applicant: International Business Machines Corporation, Armonk, NY (US)

(72) Inventors: Elizabeth V. Woodward, Cedar Park, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 13/626,968

(22) Filed: Sep. 26, 2012

(65) Prior Publication Data

US 2014/0088961 A1     Mar. 27, 2014

(51) Int. Cl.
  *G10L 15/00* (2013.01)
  *G10L 15/26* (2006.01)
  (Continued)

(52) U.S. Cl.
  CPC .................. *G10L 15/22* (2013.01); *G10L 15/26* (2013.01); *G10L 17/00* (2013.01); *G10L 2015/227* (2013.01)
  USPC ........... 704/235; 704/243; 704/244; 704/231; 704/246; 704/270

(58) Field of Classification Search
  CPC ................................ G10L 15/26; G10L 15/07
  USPC .................. 704/235, 243, 244, 231, 246, 270
  See application file for complete search history.

(56) References Cited

U.S. PATENT DOCUMENTS

| 6,397,182 B1 * | 5/2002 | Cruickshank et al. ..... 704/256.1 |
| 6,442,519 B1 * | 8/2002 | Kanevsky et al. ............ 704/243 |
| 6,754,631 B1 | 6/2004 | Din |

(Continued)

FOREIGN PATENT DOCUMENTS

| JP | 2000-347684 A | 12/2000 |
| JP | 2002-229592 A | 8/2002 |

(Continued)

OTHER PUBLICATIONS

International Search Report and Written Opinion dated Feb. 25, 2014 for International Application No. PCT/IB2013/058011, 8 pages.

(Continued)

*Primary Examiner* — Shaun Roberts
(74) *Attorney, Agent, or Firm* — Stephen J. Walder, Jr.; William J. Stock

(57) ABSTRACT

Mechanisms for performing dynamic automatic speech recognition on a portion of multimedia content are provided. Multimedia content is segmented into homogeneous segments of content with regard to speakers and background sounds. For the at least one segment, a speaker providing speech in an audio track of the at least one segment is identified using information retrieved from a social network service source. A speech profile for the speaker is generated using information retrieved from the social network service source, an acoustic profile for the segment is generated based on the generated speech profile, and an automatic speech recognition engine is dynamically configured for operation on the at least one segment based on the acoustic profile. Automatic speech recognition operations are performed on the audio track of the at least one segment to generate a textual representation of speech content in the audio track corresponding to the speaker.

25 Claims, 4 Drawing Sheets

| AUDIO SEGMENTS SYNCHRONIZED WITH AUDIO TRACK (TIMELINE) | SPEAKER | BACKGROUND | ACOUSTIC PROFILE |
|---|---|---|---|
| 0:00:00 – 0:02:30 | Dan Baker | Sea Wave | Male South Texan, Rapid & Low Pitch Voice, IT Executive, Sea Wave |
| 0:02:31 – 0:04:45 | Dan Baker | Sea Wave, Bird Sound | Male South Texan, Rapid & Low Pitch Voice, IT Executive, Sea Wave & Bird Sound |
| 0:04:46 – 0:10:30 | John Evens | Waterfall | Male, Canadian, IT Sales, Waterfall |
| 0:10:31 – 0:15:00 | Bill Baby | Boat Engine Hum | Male, CFO, IT Financial, Boat Engine Hum |
| 0:20:01 – 0:25:05 | April Steveson | Kids Playing | Female, Australian English, Slow and High Pitch Voice, Speed 50 WPM, IT Manager, Kids Playing |

(column headers 410, 420, 430, 440)

(51) Int. Cl.
*G10L 15/22* (2006.01)
*G10L 17/00* (2013.01)

(56) References Cited

U.S. PATENT DOCUMENTS

| | | |
|---|---|---|
| 7,047,191 B2 | 5/2006 | Lange et al. |
| 7,209,880 B1 | 4/2007 | Gajic et al. |
| 7,340,395 B2 | 3/2008 | Gurram et al. |
| 7,720,681 B2 | 5/2010 | Milstein et al. |
| 7,877,774 B1 | 1/2011 | Basso et al. |
| 7,966,171 B2 * | 6/2011 | Gilbert et al. ............ 704/8 |
| 2002/0046030 A1 * | 4/2002 | Haritsa et al. .......... 704/256 |
| 2002/0133337 A1 | 9/2002 | Anderson et al. |
| 2003/0154084 A1 | 8/2003 | Li et al. |
| 2008/0082332 A1 | 4/2008 | Mallett et al. |
| 2008/0201148 A1 | 8/2008 | Desrochers |
| 2008/0235022 A1 | 9/2008 | Bergl et al. |
| 2009/0106028 A1 | 4/2009 | Dhanakshirur et al. |
| 2009/0177469 A1 | 7/2009 | Findlay |
| 2010/0268534 A1 | 10/2010 | Kishan Thambiratnam et al. |
| 2010/0285778 A1 | 11/2010 | Bluvband et al. |
| 2010/0318355 A1 | 12/2010 | Li et al. |
| 2011/0093263 A1 | 4/2011 | Mowzoon |
| 2011/0184721 A1 | 7/2011 | Subramanian et al. |
| 2011/0224981 A1 | 9/2011 | Miglietta et al. |
| 2012/0130714 A1 | 5/2012 | Zeljkovic et al. |
| 2013/0262624 A1 * | 10/2013 | Acebo Ruiz et al. ........ 709/217 |
| 2013/0325474 A1 * | 12/2013 | Levien et al. ............ 704/251 |
| 2013/0346077 A1 * | 12/2013 | Mengibar et al. .......... 704/235 |

FOREIGN PATENT DOCUMENTS

| | | |
|---|---|---|
| JP | 2007-027990 A | 2/2007 |
| JP | 2007-114329 A | 5/2007 |
| JP | 2009-0003008 A | 1/2009 |
| WO | WO 00/16243 | 3/2000 |

OTHER PUBLICATIONS

Boersma, Paul et al., "Praat: doing phonetics by computer", http://www.fon.hum.uva.nl/praat, accessed on Aug. 31, 2012, 2 pages.

De Jong, Franciska et al., "Access to Recorded Interviews: A Research Agenda", ACM Journal on Computing and Cultural Heritage, vol. 1, No. 1, Article 3, Jun. 2008, pp. 3-27.

Gibbon, David et al., "Large Scale Content Analysis Engine", LS-MMRM'09, ACM, Oct. 23, 2009, pp. 97-104.

Huijbregts, Marijn , "SHoUT speech recognition toolkit", large vocabulary continuous speech recognition, http://shout-toolkit.sourceforge.net/index.html, generated Dec. 7, 2010, accessed on Aug. 31, 2012, 1 page.

Kulkarni, Ashutosh et al., "Audio Segmentation", http://cs229.stanford.edu/proj2007/kulkarniIyerSridharan-AudioSegmentation.pdf, 2007, 5 pages.

Levy, Mark et al., "Structural Segmentation of Musical Audio by Constrained Clustering", IEEE Transactions on Audio, Speech and Language Processing, vol. 16, Issue 2, http:www.violconsort.com/mark/IEEEASLP.pdf, Feb. 2008, pp. 1-9.

Muramatsu, B et al., "SpokenMedia project: Media-Linked Transcripts and Rich Media Notebooks for Learning and Teaching", Int'l. Workshop on Tech. for Education (T4E), IEEE, Aug. 4-6, 2009, pp. 6-9.

Wald, Mike, "An exploration of the potential of Automatic Speech Recognition to assist and enable receptive communication in higher education", ALT-J, Research in Learning Technology, vol. 14, No. 1, Mar. 2006, pp. 9-20.

* cited by examiner

CAPTIONING USING SOCIALLY DERIVED ACOUSTIC PROFILES

BACKGROUND

The present application relates generally to an improved data processing apparatus and method and more specifically to mechanisms for performing captioning of multimedia content, e.g., content comprising both audio and video tracks, using acoustic profiles derived from social network sources.

Captioning of audio and/or multimedia content is widely used to generate a text alternative to an audio track. The resulting text alternative can be used to perform various types of analysis, such as classification of the content, searching of the content, and the like. To achieve such captioning, Automatic Speech Recognition (ASR) is often used. ASR, also known as "speech recognition," "speech to text," "computer speech recognition," and the like, utilizes personalized speech profiles, typically obtained through training and configuration of the ASR system, to recognize spoken words in an audio track and correlate those spoken words to a text equivalent. The training of such ASR systems involves an individual speaker reading sections of text into the ASR system with the ASR system capturing the speech patterns of the individual speaker to generate a data representation of these speech patterns which can later be used as a basis for analyzing speech input by performing, for example, a pattern matching or the like.

The personalized speech profile for a speaker may include a variety of information to configure the ASR system for better quality of results. Such information may include, for example, data representing the voice and speaking style of the speaker (e.g., pronunciations and idiomatic phrases), background noises (e.g., fan, the hum of air conditioning, or other office sounds) for a normal voice environment, region-specifics for local accents and phrases (e.g., English-U.S., English-British, English-Australian, or English-Indian, and business domain such that the ASR system can use a domain-specific vocabulary (e.g., a vocabulary specializing in medical or legal terminology).

While ASR systems work well for controlled environments, ASR does not work well for audio and/or video captioning where the environment in which the audio track is captured is not known beforehand. That is, taking a video segment recorded at an outside location, as an example, the video segment will include not only the visual data but also the audio tracks corresponding to the visual data. In such a situation, ASR systems cannot be configured using known mechanisms because the quality of the audio track, the speakers involved in the audio track, as well as the background audio in the video are all unknown beforehand. A video may contain more than one speaker speaking on different subjects with different background noises, for example, which makes the static configuration of an ASR unusable or at most problematic with regard to the quality of the results that are obtained.

SUMMARY

In one illustrative embodiment, a method, in a data processing system, is provided for performing dynamic automatic speech recognition on a portion of multimedia content. The method comprises segmenting the multimedia content into a at least one segment. Each segment is a homogeneous region of content with regard to speakers and background sounds in the region of content. The method further comprises identifying, for the at least one segment, a speaker providing speech in an audio track of the at least one segment, using information retrieved from a social network service source. The method also comprises generating a speech profile for the speaker using information retrieved from the social network service source, generating an acoustic profile for the segment based on the generated speech profile, and dynamically configuring an automatic speech recognition engine of the data processing system for operation on the at least one segment based on the acoustic profile. Moreover, the method comprises performing automatic speech recognition operations on the audio track of the at least one segment to generate a textual representation of speech content in the audio track corresponding to the speaker.

In other illustrative embodiments, a computer program product comprising a computer usable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
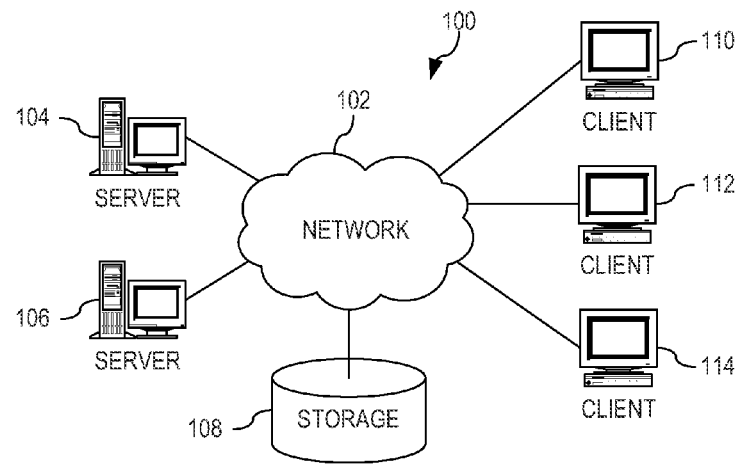
FIG. 1 is an example diagram of a distributed data processing system in which aspects of the illustrative embodiments may be implemented.

The illustrative embodiments provide mechanisms for performing captioning of audio and/or multimedia content using acoustic profiles derived from social network sources. The illustrative embodiments provide mechanisms for dynamically configuring an Automatic Speech Recognition (ASR)

system in real-time according to the changes in the speech styles and background noises of an audio/multimedia content. The ASR system is dynamically configured in real-time by deriving acoustic profiles of speakers, background noises, and vocabulary from information automatically obtained from social network sources. Based on the dynamic configuring of the ASR system, the ASR can perform its automatic speech-to-text conversion so as to generate appropriate captioning of the audio/multimedia content is made possible.

The acoustic profiles used to configure the ASR system are obtained by a pre-processor software/hardware element of the ASR engine which operates before the ASR engine attempts to perform its captioning functions. The pre-processor first analyzes the multimedia content, including the audio track, to identify segments, i.e. homogenous regions with the same speaker(s) speaking with a same background noise, along a time line of the audio track. This identification of segments may make use of various technologies for analyzing video and/or audio data to identify segments where there is a common set of video and audio data. For example, image analysis may be performed on the video data to determine segments of the multimedia content where the same person or person(s) are present in the video frame. Audio analysis may be performed to determine portions of an audio track where the same speaker(s) are speaking, or the same background noise is present.

Having identified the segments of the multimedia content, identification analysis is performed on each of the segments to identify the speaker(s) in the particular segment and the background sounds/noises in the particular segment. Various technologies may be utilized to identify the speaker(s) and background noises including facial recognition technologies, audio pattern matching technologies, metadata analysis, combined audio-visual speaker identification in which video patterns (facial, movement, gesture etc.) and pre-recorded audio patterns are used together to identify speakers, and the like. Audio segmentation may be used to recognize specific background noise such as applause, laughter, fan hums, and water flow, etc. For example, facial recognition analysis of the video data for the segment may be used to identify the facial features of speakers in the video frame, if any, which may then be compared to picture or other image data obtained from social network service sources to thereby identify the particular individuals within the video frame and thus, the video segment. Moreover, audio pattern matching analysis may be performed on the background sounds/noises in the segment to identify the sources of such sounds/noises. Metadata analysis may involve looking at any metadata associated with the multimedia content that may indicate the subjects or content of the multimedia content, including identifiers of names of persons in the multimedia content, geographical locations included in the multimedia content, time/date information, background or environment where the video is recorded to give a clue of background noise, or the like. Of course, a combination of these types of analysis may be used without departing from the spirit and scope of the illustrative embodiments.

Both the image data and the audio pattern information for performing the identifications of individuals in a segment and background sounds/noises may be retrieved from private (such as organization) and/or public social network service sources. A social networking service is an online service, platform, or website that focuses on facilitating the building of social networks or social relations among people who, for example, share profiles and interests, activities, backgrounds, or real-life/online connections or communities. A social network service consists of a representation of each user (often a user profile), his/her social links, and a variety of additional services. Most social network services are web-based and provide means for users to interact over the Internet, such as electronic mail and instant messaging. Social networking websites allow users to share ideas, activities, events, and interests within their individual networks. The main types of social networking services are those that contain category places (such as former school year or classmates), means to connect with friends (usually with self-description pages), and a recommendation system linked to trust. Some of the most popular social networking websites currently include Facebook™, Twitter™, Google+™, and LinkedIN™.

Based on the identification of the speaker(s) in the segment and the background sounds/noises, which may again be done through audio, video, and/or metadata based analysis, user profile information and video/audio postings corresponding to the identified speaker(s), which are stored as part of the social network service, may be used to gather information about the speaker(s) and generate one or more speech profiles for the speaker(s). The information from these user profile(s) and posted audio/video files may be analyzed to determine various characteristics of the speaker's speech patterns including, for example, the speaker's accent if any, voice style, vocabulary/dictionary of terms, and the like. For example, the user's profile may specify the user's home location, birthplace, or the like, including street address, state or region, country, and the like. From this information, speaker's accent may be determined, e.g., an Indian accent if the user is located or was born in India, Australian accent if located in Australia, Russian, American, South Texan accent if located in South Texas, etc. A speaker's voice style, e.g., pronunciations of words, idiomatic phrases, etc., may be determined from an analysis of the speaker's existing video/audio clips posted to the social network service, e.g., the speaker pauses after every two sentences, uses the utterance "Ummm," has a particular style of inflection, or other repetitive speaking style. Social network service information may identify the user's occupation or other interests which may provide an indication of the types of words that the user uses in speech, e.g., a doctor or nurse may utilize medical terms while an attorney/paralegal may utilize legal terms.

In addition, for each speaker in the segment of the multimedia content, the text, video, and audio postings of the corresponding user of the social network service may be analyzed to determine what words are commonly used by the user in their postings. In doing so, such common words as "a", "the", and the like may be eliminated from consideration as a commonly used word. The listing of commonly used words may then be weighted according to the frequency of use of the word in the user's postings, or "electronic presence," in the social network. This listing of commonly used words and their weightings may be used as a basis for deciding between a plurality of possible matching words when performing automatic speech recognition, as discussed in more detail hereafter.

The social network service information may be analyzed and combined to generate a speech profile for each speaker identified in the segment of the multimedia content in the manner described above. Meanwhile, the background sounds/noises in the segment may be identified through known mechanisms, such as by using established sound profile wave patterns, from a social network or database source, for the various types of background sounds/noises, e.g., birds chirping, wave sounds, wind sounds, kids playing, etc., to perform wave pattern matching. The speech profile for each speaker may be combined with background noise audio profiles to generate one or more acoustic profile(s) for the segment. The acoustic profile(s) are synchronized with the audio track of the multimedia content along a timeline of the segment.

The acoustic profile(s) are applied to the automatic speech recognition (ASR) engine to dynamically configure the ASR engine for speech recognition within the segment based on the acoustic profile(s). The ASR engine may be configured and re-configured for each segment as the segment is processed in a dynamic manner based on the particular acoustic profile(s) corresponding to the segment being processed. Alternatively, multiple instances of the ASR engine may be utilized with each instance being configured using different acoustic profile(s) for operating on different segments of the multimedia content. For example, if it is determined that a speaker in a segment from timestamp 0:30 to 2:45 is a southern Texan with background of "running river," then the ASR engine may be configured in real time to adapt to the voice style (southern Texan regional accent) with background noise elimination for the segment. When the segment changes, i.e. different speaker(s) and/or background sounds/noises, so does the acoustic profile used to configure the ASR engine.

The ASR engine analyzes the speech content in the audio track of the segment after having removed the background sounds/noises from consideration based on the background sounds/noise profiles for the segment. The ASR engine operates to recognize words in the speech content and generate textual equivalents of these words. The identification of words in speech input is generally known in the art and thus, a more detailed description is not provided herein. However, the automatic detection of words by the ASR engine in the illustrative embodiments described herein is augmented by the dynamic configuration of the ASR engine as discussed above. In addition, if the ASR determines that there are a plurality of possible textual equivalents to an spoken word in the speech content of the audio track of the segment, then the library of commonly used words for the speaker, and the corresponding weights determined by frequency of use of the words in social network service information, is used to select the most likely textual equivalent to the spoken word.

The resulting textual equivalent to the speech content in the audio track may be used to caption the multimedia content by adding textual information to the multimedia content files either as additions to the original files or as additional files that are packaged with the original multimedia content files. Such captioning may be used in many ways including text track synthesized with video and playing as closed caption or burned into the video as open caption to assist comprehension of the video, also providing captions for hearing-disabled individuals, providing textual information for searching and/or classification purposes, or the like. In addition, the caption text can be translated into different languages for users with different language backgrounds.

Thus, with the mechanisms of the illustrative embodiments, dynamic configuration of automatic speech recognition (ASR) engines is made possible using information gathered from social network service sources. Thus, rather than using a statically configured ASR engine as in the known mechanisms, the mechanisms of the illustrative embodiments automatically adapts to the particular segments of multimedia content being analyzed.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
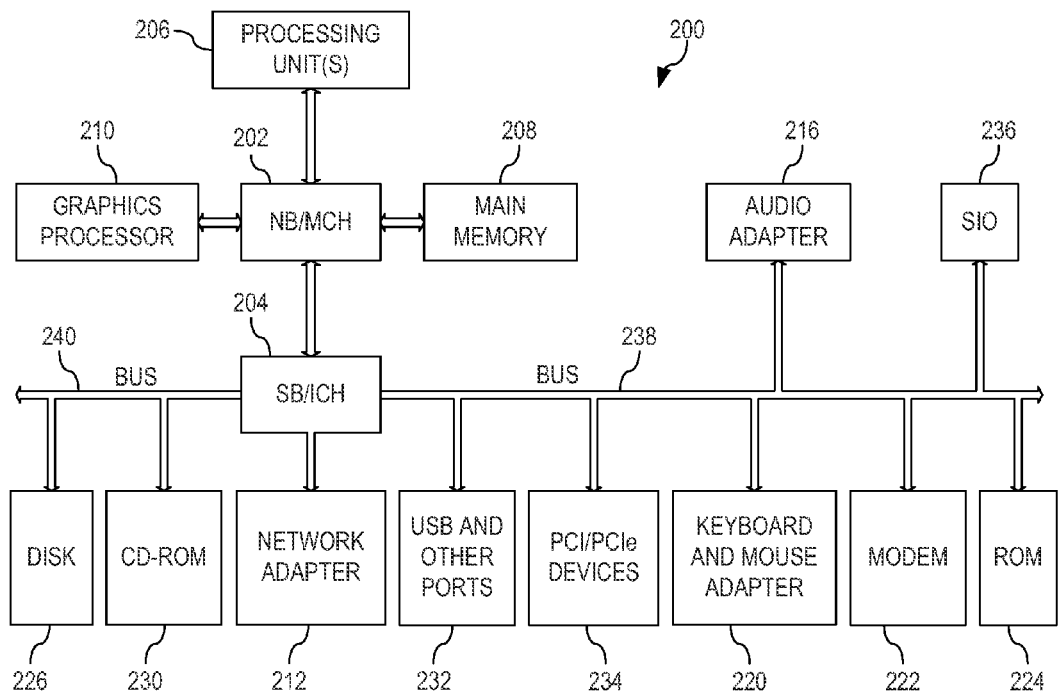
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®.

An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Referring again to FIG. 1, one or more of the server computing devices, e.g., servers 104 and 106, implements a social network service through which users of client devices, such as clients 110, 112, and 114, may establish social connections with users of other client devices, may exchange messages and textual, video, and/or audio content, play games, and perform other actions generally known to be available through social network services, via the network 102. One or more of the computing devices shown in FIG. 1 may implement an automatic speech recognition (ASR) engine in accordance with the illustrative embodiments. For example, server 104 may implement an ASR engine with dynamic configuration capability for performing speech recognition on multimedia content which may be stored in network attached storage 108, in a storage associated with one or more of the servers 104, 106, or the clients 110-114. The operation of the ASR engine may be initiated automatically in response to a request from a computing device, e.g., a server 104, 106 or client computing device 110-114, for access to multimedia content, in response to storage of the multimedia content as part of a classification operation, in response to a search for multimedia content being initiated from a client computing device 110-114 or the like, or any other automated or user initiated event or input. Regardless of the particular initiating event or input, the ASR engine on the computing device, e.g., server 104, operates to identify segments within an identified multimedia content (such as a video stored in storage 108 for example), identify speaker(s) in the segments, correlate the identified speaker(s) with user profiles in a social network service system, e.g., server 106, use the information gathered from the user profiles of the social network service system to generate acoustic profiles for the segments, apply the acoustic profiles to the ASR engine dynamically for each of the segments, and generate textual representations of the speech content of the segments using the dynamically configured ASR engine.

Figure 3:
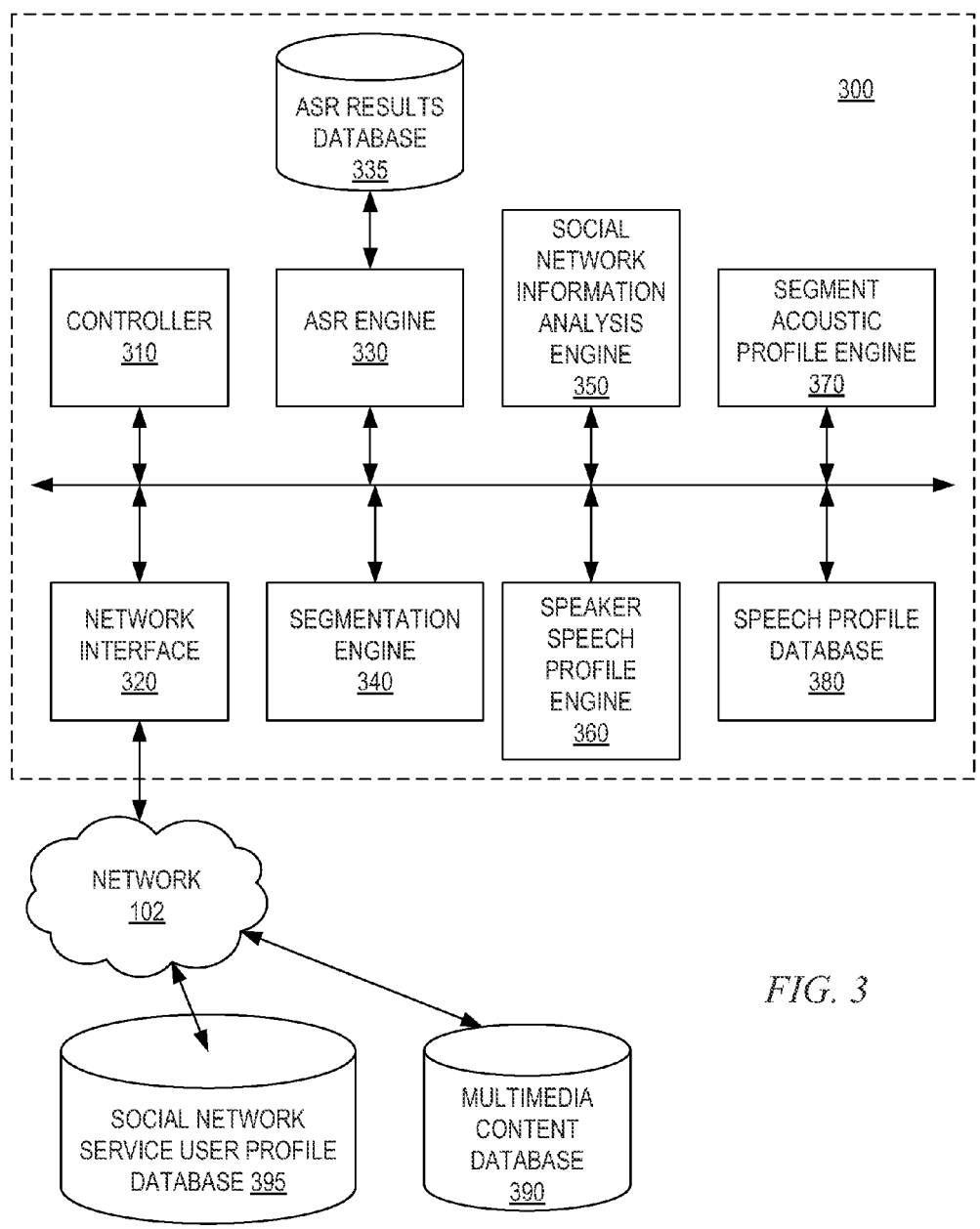
FIG. 3 is an example block diagram of a dynamically configurable automated speech recognition (ASR) engine in accordance with one illustrative embodiment.

FIG. 3 is an example block diagram of a dynamically configurable automated speech recognition (ASR) engine in accordance with one illustrative embodiment. The elements shown in FIG. 3 may be implemented in hardware, software, or any combination of hardware and software. In one illustrative embodiment, the elements 310-380 are implemented as software instructions loaded into a memory and executed by one or more processors of a data processing system and data stored in a storage device associated with the data processing system. In other illustrative embodiments, one or more of the elements 310-380 may be implemented as hardware logic elements configured to perform the operations described herein.

As shown in FIG. 3, the dynamically configurable ASR engine 300 comprises a controller 310, a network interface 320, a ASR engine 330, a segmentation engine 340, a social network information analysis engine 350, a speaker speech profile engine 360, a segment acoustic profile engine 370, and a speech profile database 380. The controller 310 controls the overall operation of the dynamically configurable ASR engine 300 and orchestrates the operation of the other elements 320-380. The network interface 320 provides a communication interface through which the dynamically configurable ASR engine 300 may send and receive data and instructions via the network 102. The network interface 320 may be used to receive, into the dynamically configurable ASR engine 300, multimedia content to be operated on, such as from multimedia content database 390 or some other source of multimedia content coupled to the network 102. The network interface 320 may further be used to receive social network service information from one or more social network service providers, such as social network service user profile database 395, via the network 102. Moreover, the network interface 320 may be used to output the ASR results that are generated to a requestor of such results, such as a user of a client computing device, server computing device, or the like (not shown), coupled to the network 102.

The ASR engine 330 is responsible for performing the actual speech recognition operations on segments of an audio track of the multimedia content. The ASR engine 330 is configured dynamically using information obtained from social network service provider systems, such as social network service user profile database 395, for example. Based on the dynamic configuration of the ASR engine 330 using acoustic profiles generated for the various segments of the audio track, the ASR engine 330 generates textual representations of the speech in the segments of the audio track and stores them as caption information for the multimedia content. The caption information, or ASR results, may be stored in the ASR results database 335 either in association with the multimedia content, or with an identifier identifying the multimedia content to which the caption information pertains. This caption information may be returned as ASR results data to a requestor of the ASR services to be used by applications for performing an operation on the ASR results data, such as classifying the multimedia content, performing a search of multimedia content, presenting the multimedia content on a computing device, or the like.

The segmentation engine 340 is responsible for analyzing the content of the multimedia content upon which the dynamically configurable ASR engine 300 operates. The segmentation engine 340 analyzes the video and audio content, as well as any metadata that may provide indications of segments in the video/audio content, of the multimedia content to identify portions of the video/audio content that are homogeneous with regard to the speaker(s) involved and the background sounds/noises. The various characteristics of the audio tracks may be analyzed, e.g., pitch, spectral, intensity, formant, and the like analysis, to determine the segments of the audio track of the multimedia content. At points along the timeline of the audio track of the multimedia content where there is a significant change in audio characteristics, e.g., a change in the speaker content or the background sound/noise content of the audio track, the start of a new segment is marked. Thus, the segmentation engine 340 breaks the audio track of the multimedia content into its constituent segments which may be individually analyzed using social network service information in accordance with the illustrative embodiments.

In addition to the actual segmentation of the audio track of the multimedia content, the segmentation engine may also perform identification operations for identifying the speaker(s) and background sounds/noises in each identified segment. This identification may be performed in combination with the segmenting of the audio track such that the two types of analysis may be performed approximately at a same time or such that the identification is performed in response to the identification of a new segment in the audio track, may be performed on a previous segment in the audio track after identification of the new segment in the audio track, or the like.

The identification of the speakers and background sounds/noises may involve, not only audio waveform pattern matching, but also video or image analysis, such as facial or object recognition in video or image data. That is, for a segment of the audio track, the corresponding portion of video data in the multimedia content, from the multimedia content database 390, may be analyzed to perform facial and object recognition. The video data may be compared against images stored in the social network service sources, such as pictures posted to user profiles and stored in social network service user profile database 395. The video data may be analyzed to identify facial features which can be compared to the facial features of the images posted to user profiles to determine if there is a match. The same may be done for standard object types, such as children, birds, dogs, trees, waves, mountains, or any other background type object.

The video data analysis may be performed by itself to identify speakers and background sounds/noises, or may be used in combination with audio waveform analysis and pattern matching. Alternatively, audio waveform analysis and pattern matching may be used solely without video data analysis. The audio waveform analysis may involve determining a pattern of audio input and comparing it against audio patterns of audio tracks or files posted to a user's social network service user profile, or even general databases of audio information for background sounds/noises.

It should be appreciated that some pre-processing of the set of social network service user profiles that are considered for such identification of speakers and background sounds may be performed in order to reduce the set of user profiles considered during the identification. For example, metadata associated with the multimedia content may provide some information that may be used to pre-filter the user profiles so that only those user profiles that are most relevant to the multimedia content are considered. As one example, the metadata associated with the multimedia content may indicate a particular organization or event with which the multimedia content is associated. As a result, a subset of the user profiles stored in association with the social network service may be selected for consideration, the selected user profiles being those that have some affiliation with the organization or event, e.g., only user profiles having some characteristic or posting mentioning the organization or event may be considered, such as the user indicating that they work or are a member of the organization, the user posting a message concerning the event, or the like. Thus, if the multimedia content is a video recording of a charity organization's fund raising event, then the metadata associated with the multimedia content may indicate the charity organization and the event and user profiles specifying that the user works for the charity organization, is a contributor to the organization, or is otherwise affiliated with the organization, or has postings mentioning the particular fund raising event, may be selected during the pre-filtering for consideration during the identification process.

It should be appreciated that rather than relying solely on metadata associated with the multimedia content, user input may also be provided that indicates selection criteria for selecting the user profiles for consideration. User input may further specify the background environment of the multimedia content, e.g., at the beach, at the playground, etc., which can be used as a pre-filter criteria for selecting a subset of general background sound/noise audio tracks to be considered for matching with the audio waveforms of the segments of the multimedia content.

Through the identification of speaker(s) and background sounds/noises, the segmentation engine 340 associates either specific user profiles of speaker(s) with the particular segments of the audio track or generic user profiles of speaker(s). That is, if possible, the segmentation engine 340 first attempts to associate a specific user profile of a speaker to the audio segment and, if no specific user profile matches the audio segment, utilizes a generic user profile to associate with the audio segment. In addition, audio profiles for the background sounds/noises are also matched in a similar manner. From the matching of the user profiles to the speaker(s) in the segments of the audio track, the social network information analysis engine 350 determines user profile characteristics that are pertinent to automatic speech recognition being applied to the segment of the audio track. For example, the user's country of origin, type of employment, interests, organization affiliations, and the like may be extracted from the user's profile. From such information, a user's accent, if any, may be determined, a dictionary of vocabulary for the user's employment may be determined and retrieved from a store set of dictionaries for various types of employment, areas of interests, organization affiliations, and the like.

In addition, the text/video/audio postings of the user to the social network service may be analyzed to identify various characteristics of the user's speech. From an analysis of the text postings, a listing of frequently used words may be generated and ranked or weighted according to their frequency of use. From an analysis of the video/audio postings, a user's speech patterns, such as low pitch, high pitch, rapid speaking, slow speaking, frequent pauses, and the like may be determined.

From all of this information, the speaker speech profile engine 360 may generate speech profiles for each of the speakers in a segment of the audio track of the multimedia content. The speech profiles may be a combination of one or more audio waveform patterns indicative of the speech of a speaker having the various characteristics of the user as identified through the social network information analysis performed by the social network information analysis engine 350. For example, the speech profiles may comprise a combination of audio waveform patterns corresponding to a South Texan using a rapid and low pitch voice. Audio waveform patterns for these various characteristics may be pre-stored in the ASR engine 330 for use in performing ASR operations and may be invoked by the ASR engine 330 in response to receiving a speech profile designating these audio waveform patterns as being part of a speaker's speech profile. A specific speech profile may include both speech (e.g., speaking style, speaker's utterance-text dictionary) and audio (e.g., background noise) information. An ASR may use the speaker's dictionary first, then a language domain for South Texan if available, then a more generic language domain until a pattern match is found in an audio portion. The ASR may try to reduce background noise before generating text based on the background noise or audio portion of the speech profile.

These speech profiles may be stored in association with an identifier of a particular user profile in the social network service so that the speech profile may be reused at a later time without having to be re-generated. Thus, after identifying a user profile corresponding to a speaker in a segment, a lookup of existing speech profiles in the speech profile database 380 may be performed by the segmentation engine 340 prior to the social network analysis engine 350 going through the process of analyzing social network user profiles and the speaker speech profile engine 360 generating a new speech profile. If a match of the identified speaker with a speech profile stored in the speech profile database 380 is not found, then the above analysis and generation of a speech profile may be performed.

In addition to the speech profiles for speakers in a segment of the audio track of a multimedia content, profiles for background sounds/noises may also be generated by the segmentation engine 340 during its identification of the background sounds/noises. That is, since such background sounds/noises are of a more generic nature than specific speakers, the social network information analysis does not need to be performed for background sounds/noises, although it certainly could be performed in some implementations and embodiments. The identification of the background sounds/noises by the segmentation engine 340 may be used to associate a generic audio waveform pattern with the segment for filtering out the background sounds and noises during ASR engine 330 analysis. That is, the background sound/noise profile may contain background sound/noise waveform patterns such as electric fans or hums etc. that may be applied to the audio portion to reduce or filter the corresponding background sounds/noise in the audio portion of the multimedia content. The background sound/noise may be identified through a short section in video that only contains background sound/noise, or alternatively, can be obtained by first removing the speaker's voice from the audio portion.

Based on the generation, or retrieval, of the speech profiles for the speakers in a segment of the audio track, and the identification and correlation of background sound/noise profiles, the segment acoustic profile engine 370 generates an acoustic profile for the entire segment of the audio track. The segment acoustic profile is provided to the ASR engine 330 for use in performing ASR operations on the segment of the audio track. The acoustic profile is a combination of the speaker profiles and the background sound/noise profiles. The acoustic profile may further comprise an indication of the particular vocabulary dictionaries to be used and listings of frequently used words specific to the particular speakers. The acoustic profile thus comprises the information that may be used to dynamically configure the ASR engine 330 for speech recognition of the speech content in the segment of the audio track.

The dynamically configured ASR engine 330 operates on the segment of the audio track to perform speech recognition and the generation of a textual representation of the speech in the segment of the audio track. The ASR engine applies the acoustic profile used to configure the ASR engine 330 to identify words in the speech content of the segment of the audio track. The ASR engine 330 may further utilize the dictionaries and listings of frequently used words to assist in the identification of words based on the speech profiles and background sound/noise profiles. For example, the ASR engine 330 may filter out portions of the segment of the audio track that correspond to background sounds/noises using the background sounds/noises profiles. The ASR engine 330 may then identify words in the remaining portions of the segment of the audio track using the speech profiles and the identified vocabulary dictionaries. If there are multiple words that may match the speech in the segment of the audio track, then the listing of frequently used words may be used to select one of the multiple words as the most likely matching word.

The ASR engine 330 may generate, as results of the ASR operation, a textual equivalent or representation of the speech in the segment of the audio track. This textual equivalent may be used to generate a caption for the multimedia content. The textual representation may be stored in association with the segment of the audio track, or an identifier of the segment of the audio track, of the multimedia content in the ASR results database 335. The ASR results in the ASR results database 335 may then be provided to a requestor of such information via the network interface 320 for use in performing other application operations, such as classification, searching, presentation of the multimedia content with captions, or the like.

Figure 4:
FIG. 4 is an example of a data structure that may be generated by the ASR engine 300 as part of this process which correlates the segment with the identified speakers, background sounds, and resulting acoustic profile.

As mentioned above, the dynamically configurable ASR engine 300 identifies speakers and background sounds/noises in a segment of an audio track, and generates an acoustic profile for the segment. FIG. 4 is an example of a data structure that may be generated by the ASR engine 300 as part of this process which correlates the segment with the identified speakers, background sounds, and resulting acoustic profile. This acoustic profile may be later used to configure the ASR engine 330 to perform the ASR operations on the audio track of the segment. As shown in FIG. 4, a first column 410 provides an identification of the segment, as identified by the segmentation engine 340 for example. A second column 420 specifies the speakers in the segment, as identified by the social network information analysis engine 350 for example. A third column 430 specifies the background sounds in the segment, as identified by the segmentation engine 340, for example. A fourth column 440 provides the resulting acoustic profile, such as may be generated by the segment acoustic profile engine 370 for example, for the segment as generated from the speech profiles, background profiles, vocabulary dictionaries, and listing of frequently used words, as discussed above. This data structure may be used to correlate the information generated by the various engines in the ASR engine 300 for use in performing ASR operations. Such a data structure may be maintained, for example, by the controller 310 and may be updated by the various engines as they perform their operations.

The operations outlined above may be performed with regard to each of the segments identified in an audio track of a multimedia content that is the subject of an ASR operation. Thus, the operations described above may be performed repetitively for each segment in a sequential manner. Alternatively, the operations may be performed in parallel by multiple instances of the ASR engine 300. Moreover, there may be a single ASR engine 300 which implements multiple ASR engines 330, each configured for operation on a different segment of the audio track using the mechanisms and engines previously described above.

Thus, the illustrative embodiments provide mechanisms for dynamically configuring a ASR engine based on information obtained from social network service sources. The dynamically configured ASR engine may then be used to perform captioning operations so as to generate textual captions for the audio track of a multimedia content under analysis. The textual captions may be used to perform various operations on the multimedia content, such as classification, searching, presentation with captions, and the like.

Figure 5:
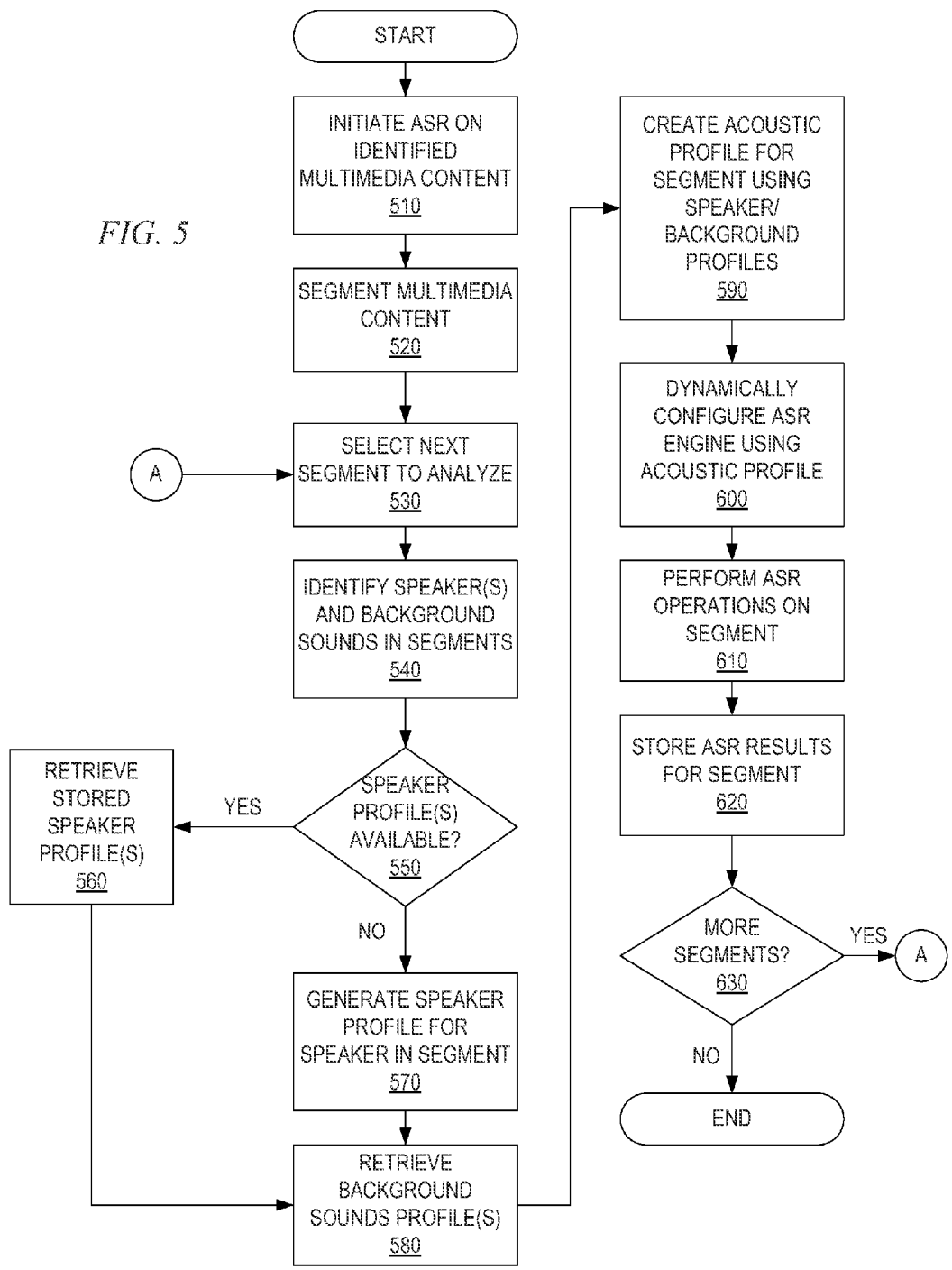
FIG. 5 is a flowchart outlining an example operation for dynamically configuring an ASR engine and applying the ASR engine to multimedia content in accordance with one illustrative embodiment.

FIG. 5 is a flowchart outlining an example operation for dynamically configuring an ASR engine and applying the ASR engine to multimedia content in accordance with one illustrative embodiment. As shown in FIG. 5, the operation starts by initiating the ASR engine on an identified multimedia content (step 510). As discussed above, the initiating of the ASR engine may be performed in response to various types of inputs, events, or the like. In response to initiating the ASR engine, the multimedia content is segmented (step 520) and a next segment upon which to operate is selected (step 530). In the selected segment, the speakers and background sounds/noises are identified (step 540). As noted above, the identification of speakers may be performed using information gathered from the social network service sources.

A determination is made, for each identified speaker in the segment, as to whether a speaker profile already exists (step 550). If so, then the speaker profile is retrieved from storage (step 560). If a speaker profile does not already exist, then a speaker profile is generated (step 570). In either case, the background sound profile(s) are retrieved (step 580). Based on the speaker profiles and background sounds profiles, and in some embodiments a listing of frequently used words, vocabulary dictionaries, and the like, an acoustic profile for the segment is generated (step 590). The ASR engine is then dynamically configured for processing the segment using the acoustic profile (step 600). The ASR engine performs the ASR operation on the segment using its dynamic configuration (step 610) and stores the ASR results for the segment (step 620). As noted above, these ASR results may be provided to other applications for operations to be performed on the multimedia content using the ASR results, such as searching, classification, presentation with captioning, and the like.

A determination is made as to whether there are more segments to be processed by the ASR engine (step 630). If so, then the operation returns to step 530 where the next segment to be analyzed is selected. If there are no more segments to be analyzed, then the operation ends.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for performing dynamic automatic speech recognition on a portion of multimedia content, comprising:
   segmenting the multimedia content into a at least one segment, wherein each segment is a homogeneous region of content with regard to speakers and background sounds in the region of content;
   identifying, for the at least one segment, a speaker providing speech in an audio track of the at least one segment, using information retrieved from a social network service source;
   generating a speech profile for the speaker using information retrieved from the social network service source;
   generating an acoustic profile for the segment based on the generated speech profile;
   dynamically configuring an automatic speech recognition engine of the data processing system for operation on the at least one segment based on the acoustic profile; and
   performing automatic speech recognition operations on the audio track of the at least one segment to generate a textual representation of speech content in the audio track corresponding to the speaker.

2. The method of claim 1, wherein performing automatic speech recognition operations on the audio track comprises generating captioning for at least one segment of the multimedia content.

3. The method of claim 1, wherein identifying a speaker providing speech in an audio track of the at least one segment comprises at least one of performing facial recognition on a corresponding portion of video in the multimedia content, audio pattern matching on the audio track of the at least one segment, or metadata analysis on metadata associated with the at least one segment.

4. The method of claim 1, wherein identifying a speaker providing speech in an audio track of the at least one segment comprises:
   performing facial recognition on the corresponding portion of video to generate facial data;
   performing a search of the social network service source for a user profile having a matching facial image; and
   identifying the speaker based on a match between the facial data and the matching facial image.

5. The method of claim 1, wherein identifying a speaker providing speech in an audio track of the at least one segment comprises:
   generating an audio pattern for the speaker from audio data in the audio track of the at least one segment;
   comparing the audio pattern to stored audio patterns for user accounts in the social network service source; and
   identifying the speaker based on a match between the audio pattern and a stored audio pattern.

6. The method of claim 1, wherein identifying a speaker providing speech in an audio track of the at least one segment comprises:
   retrieving metadata associated with the at least one segment;
   analyzing the metadata to identify indicators of one or more speakers in the at least one segment; and
   comparing the indicator of the one or more speakers in the at least one segment to user identifiers in user accounts of the social network service source to identify a user identifier matching the indicator.

7. The method of claim 1, wherein generating a speech profile for the speaker using information retrieved from the social network service source comprises:
   analyzing at least one of user profile information, video/audio postings, or text postings associated with a matching user account in the social network service source to identify characteristics of the speaker's speech patterns; and
   generating a speech profile based on the identified characteristics of the speaker's speech patterns.

8. The method of claim 7, wherein analyzing the user profile information comprises determining at least one of an accent, a cadence, or a pattern of speaking based on at least one of home location information or birthplace location information stored in the user profile information.

9. The method of claim 7, wherein analyzing the video/audio postings associated with the matching user account comprises determining at least one of an accent, a cadence, or a pattern of speaking from audio pattern analysis of the video/audio postings.

10. The method of claim 7, wherein analyzing at least one of the video/audio postings or the text postings associated with the matching user account comprises determining a dictionary of words and corresponding weightings that are commonly used in the video/audio postings or text postings.

11. The method of claim 1, wherein generating an acoustic profile for the segment based on the generated speech profile further comprises identifying one or more background sounds in the at least one segment;
   retrieving a background audio pattern matching the identified one or more background sounds; and
   generating the acoustic profile by combining the speech profile for the speaker with the background audio pattern matching the identified one or more background sounds.

12. The method of claim 11, wherein dynamically configuring an automatic speech recognition engine of the data processing system for operation on the at least one segment based on the acoustic profile comprises configuring the automatic speech recognition engine to extract the one or more background sounds from the audio track of the at least one segment based on the background audio pattern in the acoustic profile before performing automatic speech recognition on the speaker's speech in the audio track based on the speech profile.

13. A computer program product comprising a non-transitory computer readable storage medium having a computer readable program stored therein, wherein the computer readable program, when executed on a computing device, causes the computing device to:
   segment a multimedia content into a at least one segment, wherein each segment is a homogeneous region of content with regard to speakers and background sounds in the region of content;
   identify, for the at least one segment, a speaker providing speech in an audio track of the at least one segment, using information retrieved from a social network service source;
   generate a speech profile for the speaker using information retrieved from the social network service source;
   generate an acoustic profile for the segment based on the generated speech profile;
   dynamically configure an automatic speech recognition engine of the data processing system for operation on the at least one segment based on the acoustic profile; and
   perform automatic speech recognition operations on the audio track of the at least one segment to generate a textual representation of speech content in the audio track corresponding to the speaker.

14. The computer program product of claim 13, wherein performing automatic speech recognition operations on the audio track comprises generating captioning for at least one segment of the multimedia content.

15. The computer program product of claim 13, wherein identifying a speaker providing speech in an audio track of the at least one segment comprises at least one of performing facial recognition on a corresponding portion of video in the multimedia content, audio pattern matching on the audio track of the at least one segment, or metadata analysis on metadata associated with the at least one segment.

16. The computer program product of claim 13, wherein identifying a speaker providing speech in an audio track of the at least one segment comprises:
   performing facial recognition on the corresponding portion of video to generate facial data;
   performing a search of the social network service source for a user profile having a matching facial image; and
   identifying the speaker based on a match between the facial data and the matching facial image.

17. The computer program product of claim 13, wherein identifying a speaker providing speech in an audio track of the at least one segment comprises:
   generating an audio pattern for the speaker from audio data in the audio track of the at least one segment;
   comparing the audio pattern to stored audio patterns for user accounts in the social network service source; and
   identifying the speaker based on a match between the audio pattern and a stored audio pattern.

18. The computer program product of claim 13, wherein identifying a speaker providing speech in an audio track of the at least one segment comprises:

retrieving metadata associated with the at least one segment;

analyzing the metadata to identify indicators of one or more speakers in the at least one segment; and comparing the indicator of the one or more speakers in the at least one segment to user identifiers in user accounts of the social network service source to identify a user identifier matching the indicator.

19. The computer program product of claim 13, wherein generating a speech profile for the speaker using information retrieved from the social network service source comprises:

analyzing at least one of user profile information, video/audio postings, or text postings associated with a matching user account in the social network service source to identify characteristics of the speaker's speech patterns; and generating a speech profile based on the identified characteristics of the speaker's speech patterns.

20. The computer program product of claim 19, wherein analyzing the user profile information comprises determining at least one of an accent, a cadence, or a pattern of speaking based on at least one of home location information or birthplace location information stored in the user profile information.

21. The computer program product of claim 19, wherein analyzing the video/audio postings associated with the matching user account comprises determining at least one of an accent, a cadence, or a pattern of speaking from audio pattern analysis of the video/audio postings.

22. The computer program product of claim 19, wherein analyzing at least one of the video/audio postings or the text postings associated with the matching user account comprises determining a dictionary of words and corresponding weightings that are commonly used in the video/audio postings or text postings.

23. The computer program product of claim 13, wherein generating an acoustic profile for the segment based on the generated speech profile further comprises identifying one or more background sounds in the at least one segment;

retrieving a background audio pattern matching the identified one or more background sounds; and generating the acoustic profile by combining the speech profile for the speaker with the background audio pattern matching the identified one or more background sounds.

24. The computer program product of claim 23, wherein dynamically configuring an automatic speech recognition engine of the data processing system for operation on the at least one segment based on the acoustic profile comprises configuring the automatic speech recognition engine to extract the one or more background sounds from the audio track of the at least one segment based on the background audio pattern in the acoustic profile before performing automatic speech recognition on the speaker's speech in the audio track based on the speech profile.

25. An apparatus, comprising:

a processor; and a memory coupled to the processor, wherein the memory comprises instructions which, when executed by the processor, cause the processor to:

segment a multimedia content into a at least one segment, wherein each segment is a homogeneous region of content with regard to speakers and background sounds in the region of content;

identify, for the at least one segment, a speaker providing speech in an audio track of the at least one segment, using information retrieved from a social network service source;

generate a speech profile for the speaker using information retrieved from the social network service source;

generate an acoustic profile for the segment based on the generated speech profile;

dynamically configure an automatic speech recognition engine of the data processing system for operation on the at least one segment based on the acoustic profile; and perform automatic speech recognition operations on the audio track of the at least one segment to generate a textual representation of speech content in the audio track corresponding to the speaker.

* * * * *